United States Patent
Nakazato et al.

(10) Patent No.: US 12,471,014 B2
(45) Date of Patent: Nov. 11, 2025

(54) MANAGEMENT APPARATUS, MANAGEMENT METHOD, AND MANAGEMENT PROGRAM

(71) Applicant: RAKUTEN MOBILE, INC., Tokyo (JP)

(72) Inventors: Jin Nakazato, Tokyo (JP); Saki Tanaka, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/907,872

(22) PCT Filed: Sep. 30, 2021

(86) PCT No.: PCT/JP2021/036142
§ 371 (c)(1),
(2) Date: Aug. 29, 2022

(87) PCT Pub. No.: WO2023/053345
PCT Pub. Date: Apr. 6, 2023

(65) Prior Publication Data
US 2024/0196315 A1    Jun. 13, 2024

(51) Int. Cl.
*H04W 48/18*      (2009.01)
*H04B 17/336*    (2015.01)
*H04W 40/04*     (2009.01)

(52) U.S. Cl.
CPC .......... *H04W 48/18* (2013.01); *H04B 17/336* (2015.01); *H04W 40/04* (2013.01)

(58) Field of Classification Search
CPC ... H04W 72/12; H04W 24/10; H04W 72/232; H04W 64/00; H04L 1/1812; H04L 5/0051; H04B 17/336
See application file for complete search history.

(56) References Cited

U.S. PATENT DOCUMENTS 10,791,507 B1 *   9/2020   Mukherjee ............ H04W 4/029
2023/0422095 A1 *   12/2023   Eker ................... H04L 41/0806
2024/0007436 A1 *   1/2024   Waters ..................... H04L 63/20

FOREIGN PATENT DOCUMENTS

JP      2015-186204 A    10/2015

OTHER PUBLICATIONS

"3GPP TR 36.819 v11.1.0 (Dec. 2011), 3rd Generation Partnership Project; Technical Specification Group Radio Access Network; Coordinated multi-point operation for LTE physical layer aspects (Release 11)", Dec. 2011, pp. 1-69.

(Continued)

*Primary Examiner* — Iqbal Zaidi
(74) *Attorney, Agent, or Firm* — Sughrue Mion, PLLC (57) ABSTRACT

An objective is to provide a management apparatus, a management method, and a management program that can eliminate interference without involving complicated control between cells.

If interference is occurring between a first RU (Radio Unit) connected to a first virtualized DU (vDU: virtualized Distributed Unit) and a second RU connected to a second vDU different from the first vDU, a connection destination determination unit (120) determines a connection destination vDU to which the first RU and the second RU are to be connected, so that the first RU and the second RU in which the interference is occurring are connected to the same vDU. A control unit (130) implements control such that the first RU and the second RU in which the interference is occurring are connected to the connection destination vDU.

8 Claims, 10 Drawing Sheets

(56) References Cited

OTHER PUBLICATIONS

Haruhisa Hirayama, et al., "A Study of Efficient Radio Resource Allocation Method Considering Various Services in Adaptive RAN", The Institute of Electronics Information and Communication Engineers, Feb. 26, 2020, pp. 13-17, pp. 14, II. 11-22.
International Search Report for PCT/JP2021/036142 dated Nov. 30, 2021 [PCT/ISA/210].

* cited by examiner

MANAGEMENT APPARATUS, MANAGEMENT METHOD, AND MANAGEMENT PROGRAM

CROSS REFERENCE TO RELATED APPLICATIONS

This application is a National Stage of International Application No. PCT/JP2021/036142 filed Sep. 30, 2021.

TECHNICAL FIELD

The present invention relates to a management apparatus, a management method, and a management program for managing the configuration of a base station.

BACKGROUND

In 5th-generation mobile communication systems (5G: 5th-Generation mobile communication systems), there has been interest in network systems that are compliant with O-RAN (Open RAN) in order to realize C-RAN (Centralized Radio Access Network) architecture. In an O-RAN-compliant network system, the base stations are composed of logic nodes known as DUs (Distributed Units) having lower-layer functions including at least the physical (PHY) layer, logic nodes known as CUs (Central Units) having high-layer functions including a radio resource control (RRC: Radio Resource Management) layer, and RUs (Radio Units) corresponding to antennas. The CUs are able to connect to multiple DUs via networks known as midhauls. Additionally, the DUs are able to connect to multiple RUs via networks known as fronthauls. The RUs form sectors, and a configuration in which a single DU accommodates multiple sectors (multi-DU environment) is employed. Furthermore, multiple sectors form a cell served by a base station, and multiple cells form the coverage area of the communication system.

Figure 1:
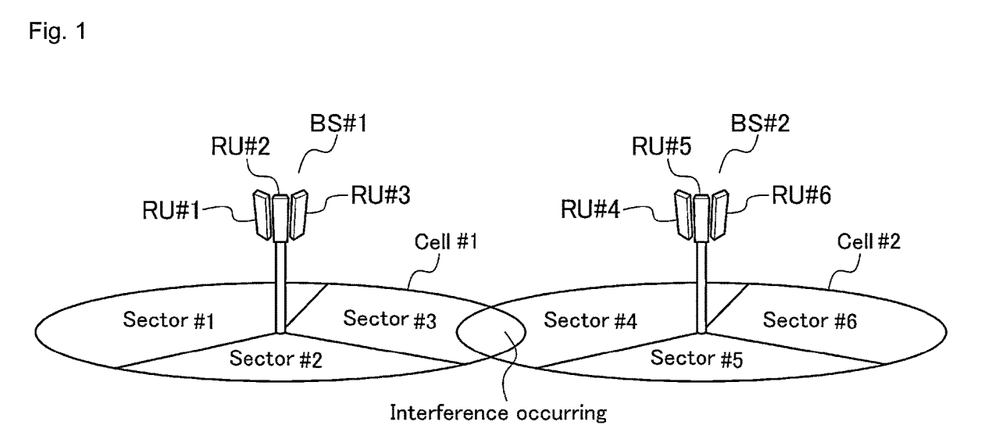
FIG. 1 is a diagram illustrating an example of a coverage area formed by two base stations.

FIG. 1 is a diagram illustrating an example of the coverage area formed by a base station (BS: Base Station) #1 and a BS #2. FIG. 1 illustrates an example in which a cell #1 served by the BS #1 and a cell #2 served by the BS #2 are each composed of three sectors. The sectors are each formed by different RUs.

Both the BS #1 and the BS #2 use coordinated multi-point transmission/reception (Coordinated Multi-point transmission/reception, hereinafter abbreviated to "CoMP") technology so that interference is eliminated within each cell, allowing the spectrum usage rate to be increased. In Non-Patent Document 1, the possibility of using coordinated beam-forming (Coordinated Beamforming: CB) or coordinated scheduling (Coordinated Scheduling: CS) as a CoMP method is considered.

CITATION LIST

Non-Patent Literature

Non-Patent Document 1: 3GPP TR 36.819 V11.1.0 (2011-12)

SUMMARY OF INVENTION

Technical Problem

However, in order to deal with interference that occurs in areas where cells overlap, intercell CoMP must be performed by coordinating multiple base stations exchanging signals with user terminals (UE: User Equipment) in those areas. However, intercell CoMP requires coordinated scheduling or beam-forming while synchronizing the multiple base stations, thus requiring complicated control between the cells. An objective of the present invention is to provide a management apparatus, a management method, and a management program that can eliminate interference without involving complicated control between cells.

Solution to Problem

One embodiment of the management apparatus according to the present invention is provided with: a connection destination determination unit that, if interference is occurring between a first RU (Radio Unit) connected to a first virtualized DU (vDU: virtualized Distributed Unit) and a second RU connected to a second vDU different from the first vDU, determines a connection destination vDU to which the first RU and the second RU are to be connected, so that the first RU and the second RU in which the interference is occurring are connected to the same vDU; and a control unit that implements control such that the first RU and the second RU in which the interference is occurring are connected to the connection destination vDU.

In one embodiment of the management apparatus according to the present invention, an available resources checking unit that checks available resource conditions in the first vDU and available resource conditions in the second vDU is further provided, and the connection destination determination unit determines that either the first vDU or the second vDU is to be set as the connection destination vDU based on at least the available resource conditions in the first vDU and the available resource conditions in the second vDU.

In one embodiment of the management apparatus according to the present invention, the connection destination determination unit determines that the vDU in which a size of available resources is larger is to be set as the connection destination vDU.

In one embodiment of the management apparatus according to the present invention, the connection destination determination unit determines the connection destination vDU such that a difference between a size of available resources in the first vDU and a size of available resources in the second vDU after connection destination control is made small.

In one embodiment of the management apparatus according to the present invention, the available resources checking unit comprises a prediction unit that predicts future resource usage amounts in the first vDU and the second vDU, and the available resources checking unit checks sizes of the available resources based on the future resource usage amount in the first vDU and the future resource usage amount in the second vDU.

In one embodiment of the management apparatus according to the present invention, the connection destination determination unit further, in accordance with comparison results between a prescribed threshold value and a size of available resources in the connection destination vDU, (i) maintains the connection destination vDU, or (ii) determines that a third vDU different from the first vDU and the second vDU is to be set as the connection destination vDU, and when the connection destination determination unit determines that the third vDU is to be set as the connection destination vDU, the control unit instantiates a new vDU as the third vDU.

In one embodiment of the management apparatus according to the present invention, the connection destination determination unit determines that a third vDU different from the first vDU and the second vDU is to be set as the connection destination vDU, and the control unit instantiates a new vDU as the third vDU.

In one embodiment of the management apparatus according to the present invention, the control unit scales out the vDU, of the first vDU and the second vDU, that has been determined to be the connection destination vDU, and scales in the vDU, of the first vDU and the second vDU, that has not been determined to be the connection destination vDU.

One embodiment of the management method according to the present invention is a management method that is executed by one or more processors, the management method including: if interference is occurring between a first RU connected to a first virtualized DU and a second RU connected to a second virtualized DU different from the first virtualized DU, determining a connection destination virtualized DU to which the first RU and the second RU are to be connected, such that the first RU and the second RU in which the interference is occurring are connected to the same virtualized DU; and implementing control such that the first RU and the second RU in which the interference is occurring are connected to the connection destination virtualized DU.

One embodiment of the management program according to the present invention makes one or more processors execute the respective units in the above-mentioned management apparatus.

Effects of Invention

According to the present invention, interference can be eliminated without involving complicated control between cells.

DESCRIPTION OF EMBODIMENTS

Hereinafter, an embodiment of the present invention will be explained in detail with reference to the drawings.

Embodiment

Figure 2:
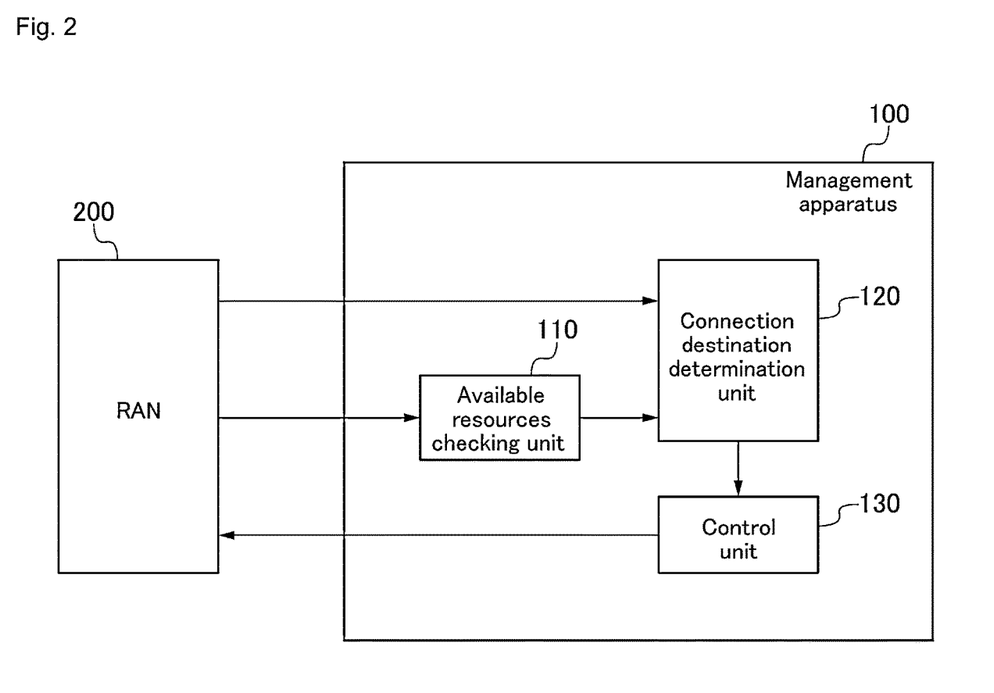
FIG. 2 is a block diagram illustrating the functional configuration of a management apparatus according to an embodiment of the present invention.

FIG. 2 is a block diagram illustrating the functional configuration of a management apparatus 100 according to an embodiment of the present invention. The management apparatus 100 controls a radio access network (RAN: Radio Access Network). Before explaining the management apparatus 100 according to the embodiment, the RAN controlled by the management apparatus 100 will be explained.

(Regarding the configuration of the RAN) As mentioned above, a RAN in an O-RAN-compliant network system is configured so as to include a CU (Central Unit), a DU (Distributed Unit), and an RU (Radio Unit).

Of the CU, the DU, and the RU in the RAN, the functions of the CU and/or the DU may be configured by virtualization. By virtualizing the functions of the CU and/or the DU to form a virtualized CU (vCU: virtualized Central Unit) and/or a virtualized DU (vDU: virtualized Distributed Unit), a general-purpose server can be used instead of the dedicated servers that were necessary for configuring RANs until now, and RANs can be inexpensively and flexible constructed. However, if the CU and the DU are both not virtualized, then the CU and the DU must be installed in the same dedicated server. Thus, the dedicated server needed to be replaced even if a problem occurred in just one of the CU or the DU. In contrast therewith, by virtualization, the vCU and the vDU can be distributively located in different general-purpose servers, allowing only a vCU or a vDU in which a problem has occurred to be removed and reconstructed. For this reason, the impact on services when a malfunction occurs can be kept to a minimum. Additionally, since the general-purpose servers on which the vCU and/or the DU are located can be easily changed, the load on the general-purpose servers can be flexibly controlled.

In the present embodiment, at least the DU functions are configured by means of a virtual machine (VM: Virtual Machine) using virtualization technology. Examples of VMs are VNFs (Virtual Network Functions) compliant with ETSI NFV reference architecture and CNFs (Cloud Network Functions) in cloud-native virtualization technologies.

Hereinafter, an example of the case in which, in addition to the DU functions, the CU functions are also configured by means of a VM using virtualization technology will be explained. Additionally, an example of the case in which the VM is constructed by VNFs compliant with ETSI NFV reference architecture will be explained. The vCU and the vDU constructed by the VNFs are each provided with one or more VNFCs (Virtualized Network Function Components).

Figure 3:
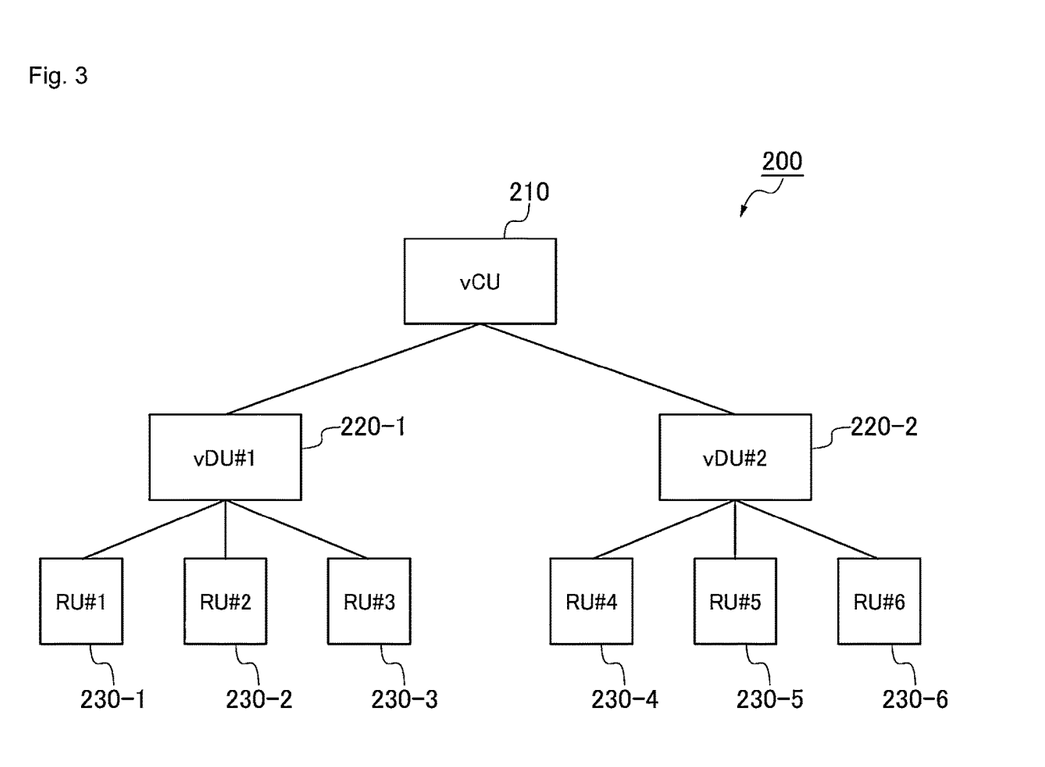
FIG. 3 is a diagram illustrating an example of the configuration of a RAN forming the coverage area in FIG. 1.

FIG. 3 is a diagram illustrating an example of the configuration of a RAN 200 forming the coverage area illustrated in FIG. 1. The RAN 200 comprises a vCU 210, vDUs 220-1, 220-2 (hereinafter referred to collectively as vDUs 220), and RUs 230-1, 230-2, 230-3, 230-4, 230-5, 230-6 (hereinafter referred to collectively as RUs 230). The vCU 210 is connected to the vDU 220-1 and the vDU 220-2. Additionally, three RUs, namely, the RU 230-1, the RU 230-2, and the RU 230-3 (hereinafter respectively also referred to, in order, as the "RU #1", the "RU #2", and the "RU #3"), are connected to the vDU 220-1 (hereinafter also referred to as the "vDU #1"), and three RUs, namely, the RU 230-4, the RU 230-5, and the RU 230-6 (hereinafter respectively also referred to as the "RU #4", the "RU #5", and the "RU #6"), are connected to the vDU 220-2 (hereinafter also referred to as the "vDU #2").

The RUs 230 each form one or more beams, for example, by beam-forming, and use one of the beams to establish a connection with a UE (User Equipment) (not illustrated). Additionally, the RU #1, the RU #2, the RU #3, the RU #4, the RU #5, and the RU #6 respectively form the sector #1, the sector #2, the sector #3, the sector #4, the sector #5, and the sector #6 in FIG. 1. As illustrated in FIG. 1, there are cases in which interference occurs in the area where the sector #3 and the sector #4 overlap.

The arrangement of the vCU 210 and the vDUs 220 may take several forms. For example, the arrangement may take a form in which the vCU 210 and the vDUs 220 are both located in edge data centers. There are several thousand edge data centers distributively located within the coverage area of the communication system. As an alternative thereto, only the vCU 210 may be located in a regional data center (RDC: Regional Data Center). There are, for example, several tens of regional data centers distributively located within the coverage area of the communication system.

Additionally, the arrangements of the respective units in the management apparatus 100 according to the present embodiment, which will be explained below, may be flexibly located in edge data centers or regional data centers in accordance with the locations of the vCU 210 and the vDUs 220.

Returning to FIG. 2, the management apparatus 100 according to the present embodiment will be explained.

The management apparatus 100 comprises an available resources checking unit 110, a connection destination determination unit 120, and a control unit 130.

The available resources checking unit 110 checks the available resources in the first vDU (referring to the example in FIG. 3, hereinafter also sometimes referred to as "vDU #1") and the available resources in the second vDU (referring to the example in FIG. 3, hereinafter also sometimes referred to as "vDU #2"). In this case, the resources are hardware resources in physical machines (servers), such as computing, storage, and network functions, used in NFVI (Network Function Virtualization Infrastructure), which is an NVF virtualization infrastructure for constructing the vDU #1 and the vDU #2. Alternatively, the resources may be radio resources allocated to the vDU #1 and the vDU #2. Furthermore, the available resources may be hardware resources that are not being used or radio resources that are not being used. The available resources checking unit 110, for example, acquires information relating to resource conditions provided from the vDU #1 and the vDU #2 in the RAN 200, and checks the available resources in the vDU #1 and the available resource conditions in the vDU #2.

The available resources checking unit 110 notifies the connection destination determination unit 120 of the check results regarding the available resource conditions. When interference is occurring between a first RU connected to the vDU #1 and a second RU connected to the vDU #2, which is different from the vDU #1, the connection destination determination unit 120 determines that a vDU to which the first RU and the second RU are to be connected will be set so that the first RU and the second RU between which interference are occurring are connected to the same vDU. In the example in FIG. 3, there is a possibility of interference between the RU #3, as the first RU, and the RU #4, as the second RU. The connection destination determination unit 120 regroups at least one of the combinations between the combination of the first RU with the vDU #1 to which the first RU is connected (the connection between the vDU #1 and the RU #3 in the example in FIG. 3) and the combination of the second RU with the vDU #2 to which the second RU is connected (the connection between the vDU #2 and the RU #4 in the example in FIG. 3). In other words, of the first RU and the second RU between which interference is occurring, the connection between the RU and the DU is changed for at least one of the RUs, and the vDU to which at least one RU is connected is changed by a control unit 130 to be explained below. The method for determining the connection destination vDU in the connection destination determination unit 120 will be explained below.

The connection destination determination unit 120 acquires, for example, from the RAN 200, interference information regarding whether or not interference is occurring between the first RU and the second RU. In the case in which interference is occurring, the interference information includes information regarding the sectors, in other words, the RUs, between which the interference is occurring. The method for acquiring the interference information will be explained below.

The connection destination determination unit 120 notifies the control unit 130 of information regarding the determined connection destination vDU as a determination result.

The control unit 130 implements control, based on the determination result that has been provided, so that the first RU and the second RU between which interference is occurring are connected to the same vDU. For example, if the connection destination determination unit 120 has determined that the vDU #1 is to be the connection destination vDU for both the first RU (the RU #3 in the example in FIG. 3) and the second RU (the RU #4 in the example in FIG. 3), then the control unit 130 controls the RAN 200 so that the second RU (RU #4), which is currently connected to the vDU #2, becomes connected to the vDU #1.

The control method in the control unit 130 may, for example, involve using an NFV MANO (Management and Orchestration) function if the vCU 210 and the vDUs 220 are virtualized in accordance with NVF reference architecture. The control unit 130, in accordance with the determination result, controls the respective functional blocks and the like of the NFV reference architecture in the virtualized network associated with the vCU 210 and the vDUs 220.

Next, the connection destination vDU determination operation in the connection destination determination unit 120 will be explained.

The connection destination determination unit 120 determines that either the vDU #1 or the vDU #2 is to be set as the connection destination vDU based on at least the available resource conditions in the vDU #1 and the available resource conditions in the vDU #2.

For example, the connection destination determination unit 120 compares the size of the available resources in the vDU #1 with the size of the available resources in vDU #2, and determines that the vDU in which the size of the available resources is larger is to be set as the connection destination vDU. In the case in which the original resource size is the same for the vDU #1 and the vDU #2, the frequency by which the resources in the connection destination vDU become strained will rise if the first RU and the second RU are connected to the vDU in which the available resources are of a smaller size. In contrast therewith, by determining that the vDU in which the size of the available resources is larger is to be the connection destination vDU, the frequency by which the resources in the connection destination vDU become strained can be reduced.

Variations in the connection destination vDU determination operation in the connection destination determination unit 120 will be explained below.

Figure 4:
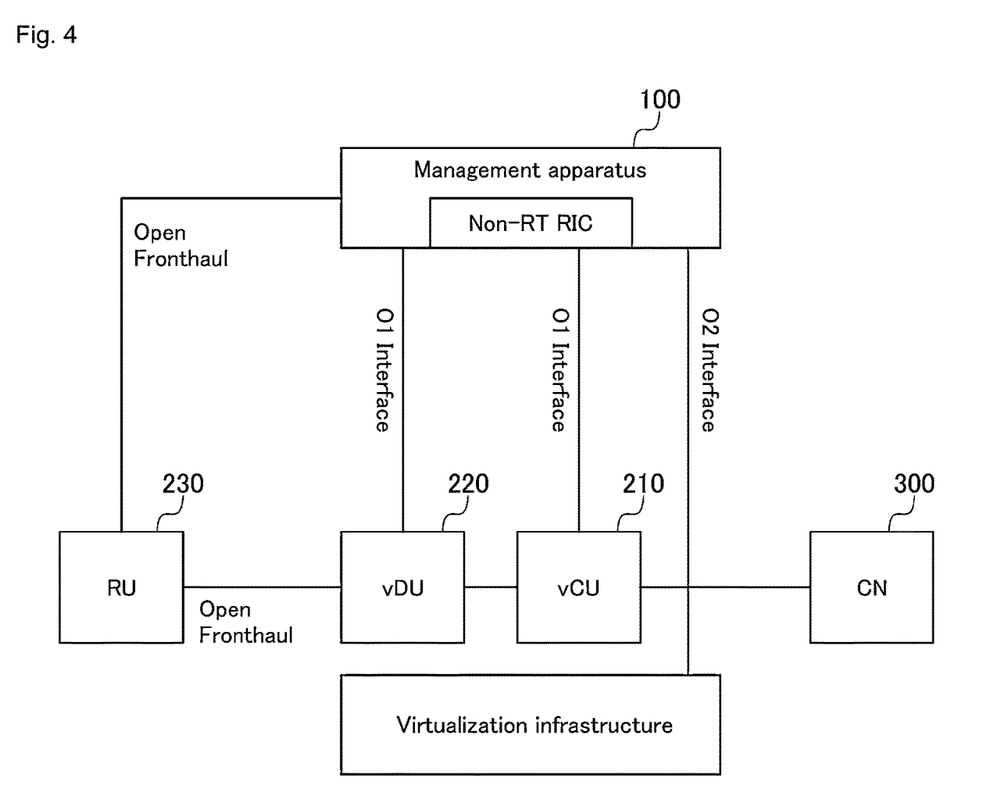
FIG. 4 is a diagram illustrating an example of a connection between a management apparatus and a base station in the case in which the management apparatus is configured in accordance with O-RAN logical architecture.

FIG. 4 illustrates a connection example between a management apparatus 100 and a RAN 200 in the case in which the management apparatus 100 is configured in accordance with O-RAN logical architecture. The management apparatus 100 may, for example, be configured by means of a Non-real-time RIC (RAN Intelligent Controller) as defined by the O-RAN ALLIANCE. The management apparatus 100 and the vCU 210 in the RAN 200 are connected by an O1 interface. The management apparatus 100 and the vDU 220 in the RAN 200 are connected by an O1 interface. Additionally, the management apparatus 100 and a virtualization infrastructure, by which the vCU 210 and the vDUs 220 are constructed, are connected by an O2 interface. Additionally, the CU 210 is connected to a core network 300 (CN: Core Network).

Next, the operations in the management apparatus 100 according to the present embodiment will be explained by using FIG. 5.

Figure 5:
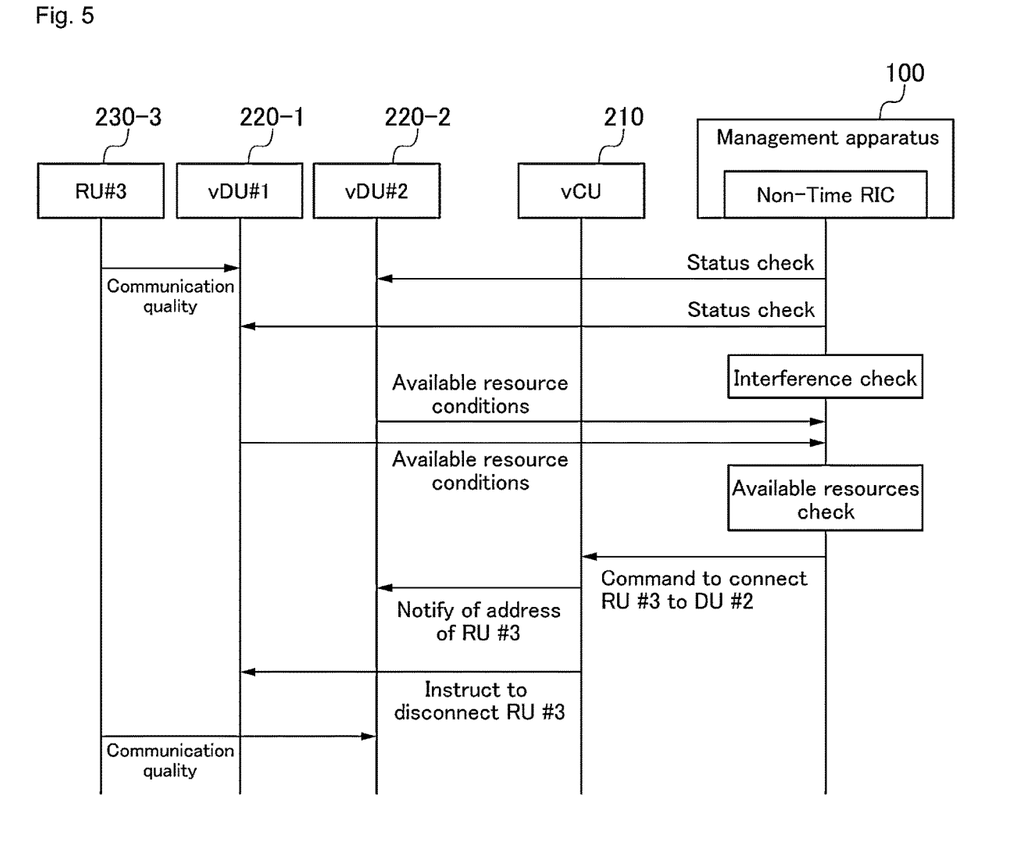
FIG. 5 is a diagram illustrating an example of a processing sequence in a management apparatus according to an embodiment.

FIG. 5 is a diagram illustrating an example of the processing sequence in the management apparatus 100 according to the present embodiment.

The RU #1, the RU #2, and the RU #3 connected to the vDU #1 in FIG. 3 notify the vDU #1 of information regarding the communication quality. In this case, examples of the communication quality include the reception power, the SINR (Signal& #8722; to #8722; Interference plus Noise power Ratio), the throughput, the reception error rate, or the like in UEs that have established connections with the RUs. Although only the RU #3 is illustrated in FIG. 5, the RU #1, the RU #2, and the RU #3 notify the vDU #1 of information regarding the communication quality. Additionally, the RU #4, the RU #5, and the RU #6 in FIG. 3 notify the vDU #2 of information regarding the communication quality.

The connection destination determination unit 120 in the management apparatus 100 periodically checks each vDU regarding the communication quality in the sectors in which the respective RUs are formed. The connection destination determination unit 120 acquires interference information indicating the presence or absence of interference, regarding whether or not interference is occurring in any of the sectors, based on the communication quality. In the case in which interference is occurring, the interference information includes information regarding the sectors, in other words, the RUs, between which the interference is occurring (interference check).

In the case in which interference is occurring, the available resources checking unit 110 in the management apparatus 100 checks the available resource conditions in the vDUs to which the RUs in which the interference is occurring are connected (available resources check). For example, if interference is occurring between the RU #3 connected to the vDU #1 and the RU #4 connected to the vDU #2, then the available resources checking unit 110 checks the sizes of the available resources in the vDU #1 and the vDU #2.

Furthermore, the connection destination determination unit 120 determines that, of the vDU #1 and the vDU #2, the vDU in which the size of available resources is larger is to be set as the connection destination vDU. For example, in the case in which the size of the available resources is larger in the vDU #2 than in the vDU #1, then the connection destination determination unit 120 determines that the vDU #2 is to be set as the connection destination vDU.

Next, the connection destination determination unit 120 notifies the control unit 130 of information indicating that the connection destination vDU of the RU #3 and the RU #4 has been determined to be the vDU #2. The control unit 130 instructs the vCU 210 to change the connection destination of the RU #3 to the vDU #2.

Upon receiving the information indicating that the connection destination vDU of the RU #3 and the RU #4 has been determined to be the vDU #2, the vCU 210 implements control to connect the RU #3 and the RU #4 in which interference is occurring to the vDU #2 that is the determined connection destination vDU. For example, the vCU 210 outputs commands instructing the vDU #1 and the vDU #2 that the RU #3 currently connected to the vDU #1 is to be connected to the vDU #2. The vCU 210 notifies the vDU #2 of the address of the RU #3 so that the RU #3 is connected to the vDU #2, and the vDU #2 registers the address of the RU #3. Additionally, the vCU 210 notifies the vDU #1 that the RU #3 should be disconnected and the vDU #1 deletes the address of the RU #3. In this way, the RU #3 is connected to the vDU #2.

The control method for changing the connection destination vDU in the control unit 130 is not limited thereto. As explained above, the control unit 130 may, for example, use NFV MANO (Management and Orchestration) functions as the control method, thereby allowing the vDUs 220 and the vCU 10 to be controlled in accordance with the connection destination vDU. In this case, the control unit 130 controls the respective functional blocks in the NFV reference architecture so that the RU #3 and the RU #4 are connected to the connection destination vDU that has been determined.

Figure 6:
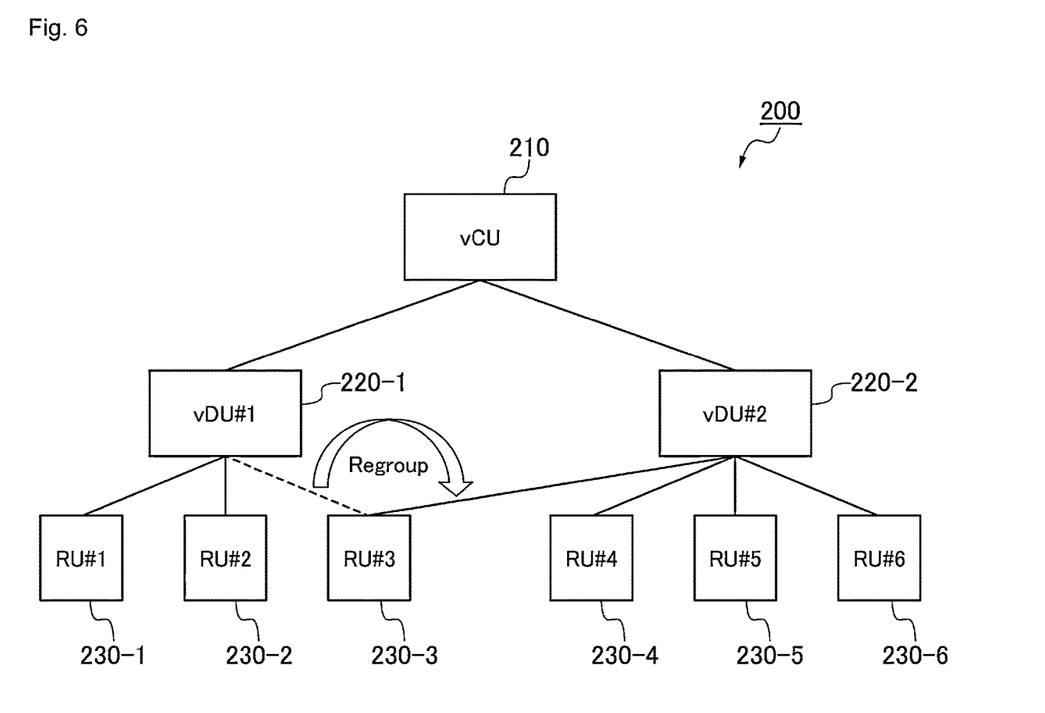
FIG. 6 is a diagram illustrating an example of the configuration of a RAN after connections between RUs and vDUs have been regrouped.

FIG. 6 illustrates the configuration of the RAN 200 after the connection destination vDU has been set to the vDU #2 and the connections between the RUs and the DUs have been regrouped. FIG. 6 illustrates that the RU #3 has been reconnected from the vDU #1 to the vDU #2 by regrouping the connections.

Thus, in the management apparatus 100 in the present embodiment, when interference is occurring between the RU #3 and the RU #4, the available resources checking unit 110 checks the available resource conditions in the vDU #1 to which the RU #3 is connected and the available resource conditions in the vDU #2 to which the RU #4 is connected. Furthermore, the connection destination determination unit 120 determines, based on at least the available resource conditions in the vDU #1 and the available resource conditions in the vDU #2, that either the vDU #1 or the vDU #2 is to be set as the connection destination vDU. For example, the connection destination determination unit 120 determines that the vDU for which the size of the available resources is larger is to be set as the connection destination vDU.

As described above, the management apparatus 100 makes a first RU (RU #3) and a second RU (RU #4), between which interference is occurring, both connect to the same vDU. As a result thereof, interference elimination control is performed by applying, to the first RU and the second RU, technology such as CoMP, which is normally implemented in the same vDU (vDU #1 or vDU #2), thereby making synchronization control between the vDU #1 and the vDU #2 unnecessary for eliminating the interference between the RU #3 and the RU #4. For this reason, interference between the first RU and the second RU can be avoided by applying interference elimination technology in the same cell without requiring control between adjacent cells.

Additionally, in 5G mobile communication systems in general, many base stations are installed, and at the time the base stations are installed, operators perform operational management such as by adjusting the installation locations and the orientations of the antennas so that interference with other base stations will not occur. However, if an operator were required to perform operational management each time a base station is added, then the operator work would become complicated. In contrast therewith, in the case in which the management apparatus 100 according to the present embodiment is used, interference can be avoided by having RUs between which interference is occurring connect to the same vDUs, thereby making operator work unnecessary.

(Variation 1)

As another embodiment, the connection destination determination unit 120 determines a connection destination vDU so that the difference between the sizes of the available resources in the vDU #1 and the available resources in the vDU #2 is made small after connection destination control. For example, there are cases in which the original resource sizes differ between the vDU #1 and the vDU #2, and although the original resource size is smaller for the vDU #1 than for the vDU #2, the currently available resources are larger than those in the vDU #2. In such a case, if the second RU is connected to the vDU #1 in which the original resource size is smaller, then in the case in which the resource usage amount in the second RU is larger, the resource usage rate in the vDU #1 could rise, and in some cases, the resources in the vDU #1 could be strained. Meanwhile, although the size of currently available resources is smaller in the vDU #2 than in the vDU #1, the original resource size is larger than that of the vDU #1. Thus, in some cases, the resources in the vDU #2 will not be strained even if the first RU is connected to the vDU #2.

For this reason, the frequency by which the resources in the connection destination vDU become strained can be reduced by determining the connection destination vDU so that the difference between the size of the available resources in the vDU #1 and the size of the available resources in the vDU #2 is made small after connection destination control. Additionally, the disparity in the resource usage amounts between the vDU #1 and the vDU #2 can be decreased, thereby reducing cases in which the processing load in one of the vDUs becomes extremely high.

(Variation 2)

Figure 7:
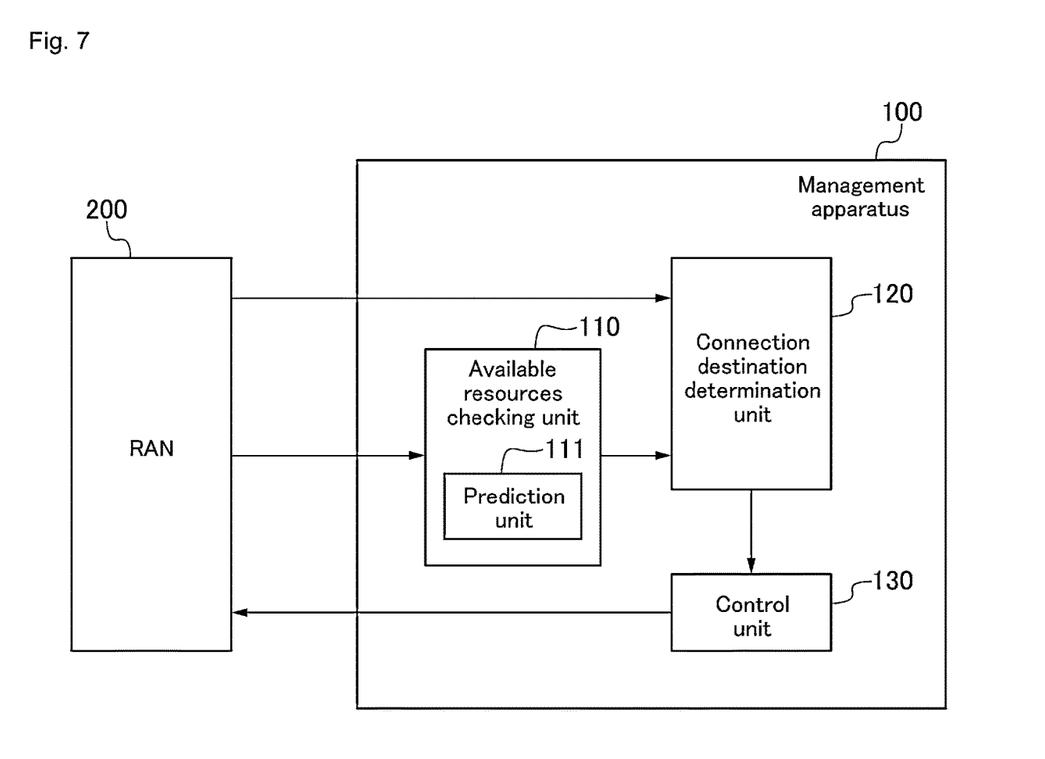
FIG. 7 is a block diagram illustrating a modified example of the functional configuration of a management apparatus according to an embodiment.

Additionally, as illustrated in FIG. 7, the available resources checking unit 110 may be provided with a prediction unit 111 that predicts the future resource usage amounts in the vDU #1 and the vDU #2, and the sizes of the available resources in the vDU #1 and the vDU #2 may be checked based on the future resource usage amount in the vDU #1 and the future resource usage amount in the vDU #2. The method for predicting the future predicted resource usage amounts in the prediction unit 111 may, for example, involve making predictions based on application information regarding the respective UEs connected to the respective RUs. The application information in the UEs may be acquired, for example, by querying the UPF (User Plane Function) in a core network, though the method is not limited thereto. Additionally, for example, in cases in which there are scheduled to be events that will cause sudden increases or sudden decreases in demand for playing distributed moving images or the like, the connection destination vDU can be more appropriately set by using the future predicted resource usage amount to determine the connection destination vDU, thereby allowing the frequency by which the resources in the connection destination vDU become strained in the future to be reduced.

(Variation 3)

The connection destination determination unit 120 may further, in accordance with comparison results between a prescribed threshold value and the size of the available resources in the connection destination vDU, (i) maintain the connection destination vDU, or (ii) determine that a third vDU (hereinafter also referred to as "vDU #3") different from the vDU #1 and the vDU #2 is to be set as the connection destination vDU.

For example, in the case in which the size of the available resources in the connection destination vDU that has been determined is equal to or larger than the prescribed threshold value, then the connection destination determination unit 120 arrives at a determination result that the connection destination vDU is to be maintained and said connection destination vDU will be the final connection destination (i). On the other hand, if the size of the available resources in the connection destination vDU that has been determined is less than the prescribed threshold value, then the connection destination determination unit 120 determines that the vDU #3 is to be set as the connection destination vDU (ii).

If the connection destination determination unit 120 has determined that the vDU #3 is to be set as the connection destination vDU, then the control unit 130 instantiates the vDU #3 and implements control to connect the first RU and the second RU, in which interference is occurring, to the vDU #3.

Figure 8:
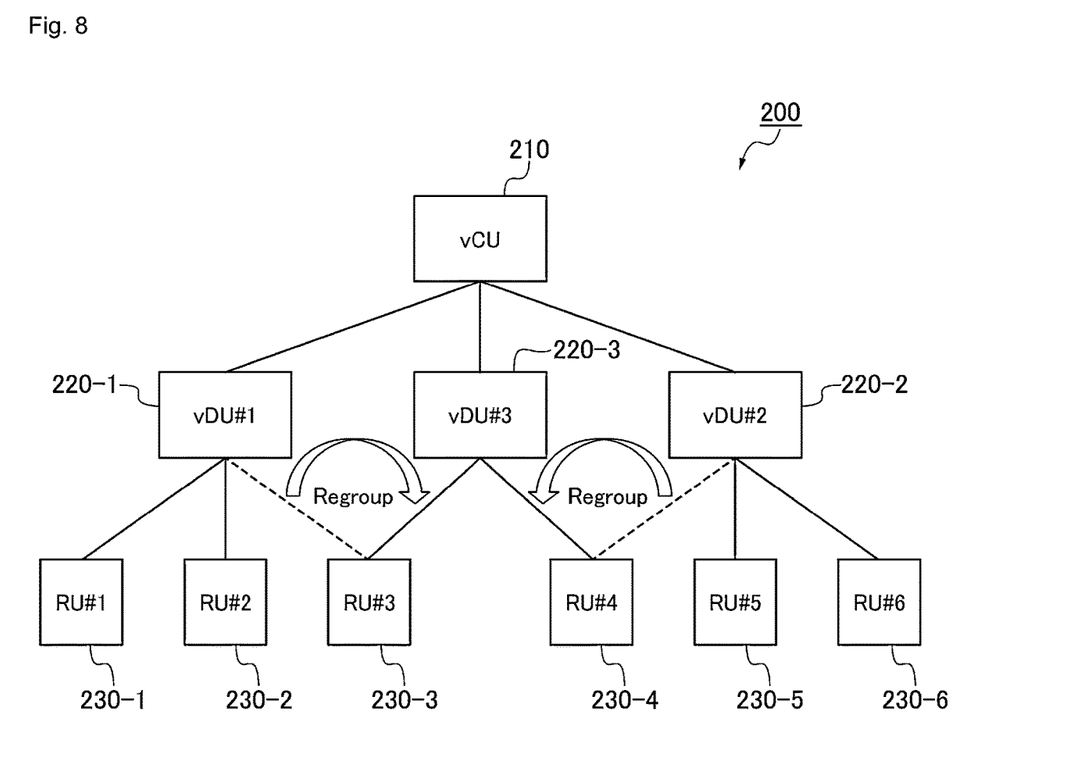
FIG. 8 is a diagram illustrating an example of the configuration of a RAN after connections between RUs and vDUs have been regrouped.

FIG. 8 illustrates the configuration of the RAN 200 after the connection destination vDU has been set to be the vDU #3 and the connections of the RUs and the vDUs have been regrouped. FIG. 8 illustrates how, due to the regrouping of the connections, the RU #3 is reconnected from the vDU #1 to the vDU #3, and the RU #4 is reconnected from the vDU #2 to the vDU #3.

By connecting both the first RU and the second RU to the newly added vDU #3, interference can be suppressed while also avoiding straining the resources in the vDU #1 and the vDU #2 that already exist.

(Variation 4)

Figure 9:
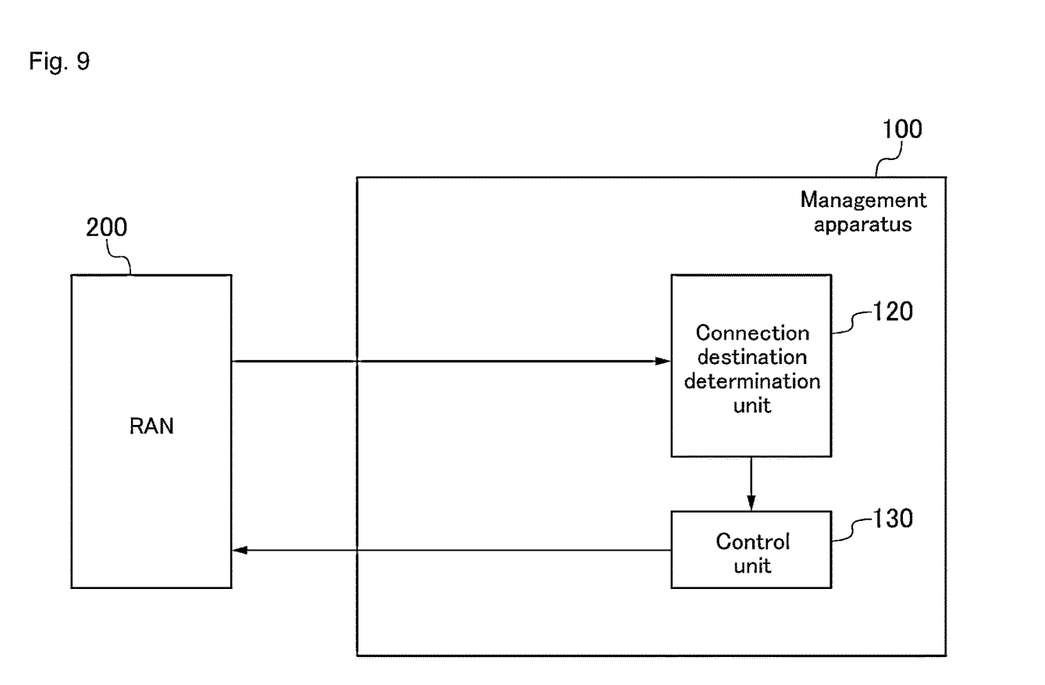
FIG. 9 is a block diagram illustrating another modified example of the functional configuration of a management apparatus according to an embodiment.

Additionally, as illustrated in FIG. 9, the management apparatus 100 may not be provided with the available resources checking unit 110, and the connection destination determination unit 120 may determine that the vDU #3, which is different from the vDU #1 and the vDU #2, is to be set as the connection destination vDU. In this case, the control unit 130 instantiates a new vDU as the vDU #3.

As a result thereof, a first RU and a second RU in which interference is occurring are connected to the same vDU without checking the available resources. Thus, the processing until interference is suppressed can be reduced.

(Variation 5)

In the case in which virtualization technology is used and the vDUs 220 are, for example, constructed by means of VNFs, the sizes of the resources in the vDUs 220 can be increased by increasing the number of VNFCs constituting the VNFs or by increasing (scaling out) the hardware resources allocated to the NFVI. Thus, the control unit 130 may scale out the virtualized DU, of the vDU #1 and the vDU #2, that has been determined to be the connection destination vDU. Due to this feature, the size of the available resources in the connection destination vDU can be increased and the straining of resources in the connection destination vDU can be suppressed.

Conversely, the sizes of the resources in the vDUs 220 can be decreased by decreasing the number of VNFCs or by decreasing (scaling in) the hardware resources allocated to the NFVI. Thus, the control unit 130 may scale in the vDU (non-connection destination vDU), of the vDU #1 and the vDU #2, that has not been determined to be the connection destination vDU. Additionally, if there are no longer any RUs connected to the non-connection destination vDU as a result of the connections between the RUs and the vDUs being regrouped, then the control unit 130 may delete the non-connection destination vDU. Due to these features, some or all of the virtualization infrastructure allocated to the non-connection destination vDU can be allocated to another VM.

Figure 10:
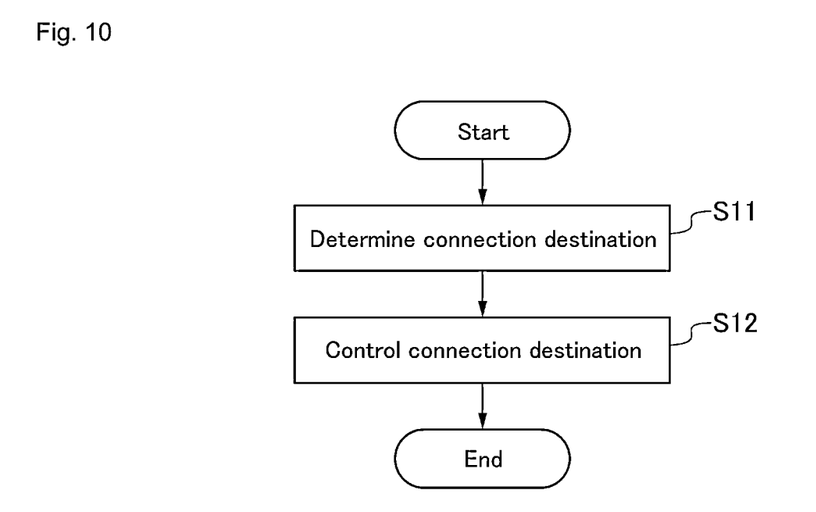
FIG. 10 is a flow chart indicating a RAN management method according to the present embodiment.

FIG. 10 is a flow chart illustrating a RAN management method according to an embodiment of the present invention.

The management method according to the present invention includes: if interference is occurring between a first RU connected to a vDU #1 and a second RU connected to a vDU #2 different from the vDU #1, determining a connection destination vDU to which the first RU and the second RU are to be connected, so that the first RU and the second RU in which the interference is occurring are connected to the same vDU (S11: connection destination determination); and implementing control such that the first RU and the second RU in which the interference is occurring are connected to the determined connection destination vDU (S12: connection destination control).

The connection destination determination in S11 may involve determining that either the vDU #1 or the vDU #2 is to be set as the connection destination vDU based on at least the available resource conditions in the vDU #1 and the available resource conditions in the vDU #2.

Additionally, the connection destination determination in S11 may involve determining that the virtualized DU in which the size of available resources is larger is to be set as the connection destination vDU.

Additionally, the connection destination determination in S11 may involve determining the connection destination vDU such that the difference between the size of the available resources in the vDU #1 and the size of the available resources in the vDU #2 is made small after connection destination control.

Additionally, the connection destination determination in S11 may involve (i) implementing the connection to the connection destination vDU in accordance with comparison results between a prescribed threshold value and the size of the available resources in the connection destination vDU, or (ii) determining that a vDU #3 different from the vDU #1 and the vDU #2 is to be set as the connection destination vDU.

Additionally, the connection destination determination in S11 may involve determining that a vDU #3 different from the vDU #1 and the vDU #2 is to be set as the connection destination vDU. If it is determined that the vDU #3 is to be set as the connection destination vDU, during the connection destination control in S12, a new vDU is instantiated as the vDU #3.

The connection destination control in S12 may involve scaling out the vDU, of the vDU #1 and the vDU #2, that has been determined to be the connection destination vDU, and scaling in the vDU, of the vDU #1 and the vDU #2, that has not been determined to be the connection destination vDU.

The present invention is not limited to the management apparatus and the management method explained above, and the present invention also includes a management program.

That is, a management program for making one or more processors execute the respective units in the management apparatus 100 is also included in the present invention.

The above-mentioned program may be provided by being recorded on a computer-readable non-transitory storage medium.

Additionally, the present invention is not limited to the embodiments explained above, and includes various modified examples in which constituent elements have been added, removed or replaced with respect to the configurations explained above.

For example, in the description above, the case in which the available resource conditions refer to the absolute amount (size) of available resources was explained. However, there is no limitation thereto. The available resource conditions may be represented by the ratio of available resources to the total resources or may be expressed by both the absolute amount and the ratio.

REFERENCE SIGNS LIST

100 Management apparatus
110 Available resources checking unit
111 Prediction unit
120 Connection destination determination unit
130 Control unit
200 RAN
210 vCU
220, 220-1, 220-2, 220-3 vDU
230, 230-1, 230-2, 230-3, 230-4, 230-5, 230-6 RU
300 CN (Core Network)

The invention claimed is:

1. A management apparatus comprising:
a connection destination determination unit that, in a state in which interference is occurring between a first Radio Unit (RU) connected to a first virtualized Distributed Unit (vDU) and a second RU connected to a second vDU different from the first vDU, determines a connection destination vDU to which the first RU and the second RU are both to be connected from among a plurality of vDUs including the first vDU and the second vDU;
an available resources checking unit that checks available resource conditions in the first vDU and available resource conditions in the second vDU; and
a control unit that implements control such that the first RU and the second RU in which the interference is occurring are connected to the connection destination vDU,
wherein the connection destination determination unit determines that either the first vDU or the second vDU is to be set as the connection destination vDU based on at least the available resource conditions in the first vDU and the available resource conditions in the second vDU.

2. The management apparatus according to claim 1, wherein the connection destination determination unit determines that a vDU in which a size of available resources is larger is to be set as the connection destination vDU.

3. The management apparatus according to claim 1, wherein the connection destination determination unit determines the connection destination vDU such that a difference between a size of available resources in the first vDU and a size of available resources in the second vDU is made small after connection destination control.

4. The management apparatus according to claim 1 wherein
the available resources checking unit comprises
a prediction unit that predicts future resource usage amounts in the first vDU and the second vDU, and
the available resources checking unit checks sizes of available resources based on the future resource usage amount in the first vDU and the future resource usage amount in the second vDU.

5. The management apparatus according to claim 1, wherein the connection destination determination unit further, in accordance with comparison results between a prescribed threshold value and a size of available resources in the connection destination vDU, (i) maintains the connection destination vDU, or (ii) determines that a third vDU different from the first vDU and the second vDU is to be set as the connection destination vDU, and
when the connection destination determination unit determines that the third vDU is to be set as the connection destination vDU, the control unit instantiates a new vDU as the third vDU.

6. The management apparatus according to claim 1, wherein
the connection destination determination unit determines that a third vDU different from the first vDU and the second vDU is to be set as the connection destination vDU, and
the control unit instantiates a new vDU as the third vDU.

7. The management apparatus according to claim 1, wherein the control unit
scales out a vDU, of the first vDU and the second vDU, that has been determined to be the connection destination vDU, and
scales in a vDU, of the first vDU and the second vDU, that has not been determined to be the connection destination vDU.

8. A management method that is executed by one or more processors, the management method including:
in a state in which interference is occurring between a first Radio Unit (RU) connected to a first virtualized Distributed Unit (vDU) and a second RU connected to a second virtualized DU different from the first virtualized DU, determining a connection destination virtualized DU to which the first RU and the second RU are both to be connected from among a plurality of vDUs including the first vDU and the second vDU;
checking available resource conditions in the first vDU and available resource conditions in the second vDU; and
implementing control such that the first RU and the second RU in which the interference is occurring are connected to the connection destination virtualized DU,
wherein the determining includes determining that either the first vDU or the second vDU is to be set as the connection destination vDU based on at least the available resource conditions in the first vDU and the available resource conditions in the second vDU.

* * * * *